(12) United States Patent
Mizusako et al.

(10) Patent No.: US 10,444,574 B2
(45) Date of Patent: Oct. 15, 2019

(54) LIQUID CRYSTAL DISPLAY AND ELECTRONIC EQUIPMENT

(71) Applicant: SEIKO EPSON CORPORATION, Tokyo (JP)

(72) Inventors: Kazuhisa Mizusako, Shiojiri (JP); Hiroyuki Hosaka, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/039,816

(22) Filed: Jul. 19, 2018

(65) Prior Publication Data

US 2019/0033670 A1 Jan. 31, 2019

(30) Foreign Application Priority Data

Jul. 31, 2017 (JP) ................................ 2017-147394

(51) Int. Cl.
*G09G 3/36* (2006.01)
*G02F 1/1343* (2006.01)
(Continued)

(52) U.S. Cl.
CPC ...... *G02F 1/134363* (2013.01); *G02F 1/1337* (2013.01); *G02F 1/133512* (2013.01); *G02F 1/133528* (2013.01); *G02F 1/136286* (2013.01); *G09G 3/3648* (2013.01); *G09G 3/3677* (2013.01); *G09G 3/3688* (2013.01); *G02F 2001/13373* (2013.01); *G02F 2001/133638* (2013.01); *G02F 2201/121* (2013.01); *G02F 2201/123* (2013.01); *G09G 2320/0233* (2013.01)

(58) Field of Classification Search
CPC .. G09G 3/3648; G09G 3/3677; G02F 1/1337; G02F 1/134363
See application file for complete search history.

(56) References Cited

U.S. PATENT DOCUMENTS 9,443,987 B2 * 9/2016 Miyanaga ........... H01L 29/7869
9,647,128 B2 * 5/2017 Yamazaki ........... H01L 29/7869
(Continued)

FOREIGN PATENT DOCUMENTS

JP 2001-281626 A 10/2001
JP 2013-101392 A 5/2013
(Continued)

*Primary Examiner* — Calvin C Ma
(74) *Attorney, Agent, or Firm* — Oliff PLC

(57) ABSTRACT

A liquid crystal display to suppress a reverse tilt domain that includes pixel electrodes, a first light-shielding film arranged in a first direction along a first side of the pixel electrodes; a second light-shielding film arranged in a second direction along a second side of the pixel electrodes, a correction unit corrects a first input image signal so that a first difference between a first voltage applied to the first pixel electrode and a second voltage applied to a second pixel electrode, and a second difference between the first voltage and a third voltage to be applied to a third pixel electrode are reduced. A width of the first light-shielding film is narrower than a width of the second light-shielding film. The correction unit corrects the first input image signal so that a decreased amount of the first difference is greater than a decreased amount of the second difference.

9 Claims, 8 Drawing Sheets

(51) Int. Cl.
  *G02F 1/1335* (2006.01)
  *G02F 1/1362* (2006.01)
  *G02F 1/1337* (2006.01)
  *G02F 1/13363* (2006.01)

(56) References Cited

U.S. PATENT DOCUMENTS

2009/0237578 A1    9/2009   Naka et al.
2011/0109815 A1    5/2011   Hosaka et al.
2016/0363797 A1   12/2016   Kimura et al.
2017/0316727 A1   11/2017   Mizusako et al.

FOREIGN PATENT DOCUMENTS

JP          5454092 B2      3/2014
JP       2017-198889 A     11/2017
WO       2015/129057 A1     9/2015

\* cited by examiner

LIQUID CRYSTAL DISPLAY AND ELECTRONIC EQUIPMENT

BACKGROUND

1. Technical Field

The disclosure relates to a liquid crystal display and electronic device.

2. Related Art

Liquid crystal display devices are used as light valves for projectors or the like. In a liquid crystal panel of a liquid crystal display, a plurality of pixel electrodes is arranged in a horizontal direction and a vertical direction. A predetermined voltage is applied to each of the pixel electrodes based on an image signal. A lateral electric field occurs due to application of a different voltage between pixel electrodes aligned in the horizontal direction or the vertical direction. A reverse tilt domain being a region having irregular alignment of liquid crystals may occur due to the lateral electric field. A technology is conceivable that corrects an image signal to suppress occurrence of a reverse tilt domain (see, for example, Japanese Patent No. 5454092).

Further, light-shielding films extending in the horizontal direction and the vertical direction and intersecting each other in a planar view are provided in the liquid crystal panel to define an opening region (translucent region) of each pixel. These light-shielding films are formed of, for example, a scanning line and a data line. A width of the scanning line and a width of the data line are not equal in most cases.

As described below in detail, the inventors of the disclosure have found that a reverse tilt domain occurring in the vicinity of a light-shielding film having a relatively narrow width of intersecting light-shielding films is visually identified in an opening region of a pixel more easily than a reverse tilt domain occurring in the vicinity of a light-shielding film having a relatively wide width.

The disclosure has been made in view of the above-mentioned circumstances, and the disclosure provides a technology capable of suppressing a tendency where a reverse tilt domain is easily visually identified in the vicinity of a light-shielding film having a narrow width of intersecting light-shielding films.

SUMMARY

One aspect of a liquid crystal display according to the disclosure includes a plurality of pixel electrodes arranged in a first direction and a second direction intersecting the first direction, an element substrate including the plurality of pixel electrodes, a counter substrate including a common electrode, a liquid crystal layer sandwiched between the element substrate and the counter substrate, a first light-shielding film extending in the first direction along a first side of the plurality of pixel electrodes, a second light-shielding film extending in the second direction along a second side of the plurality of pixel electrodes, a liquid crystal panel in which a width of the first light-shielding film is narrower than a width of the second light-shielding film, a correction unit configured to specify, based on an input image signal, a set of pixel electrodes of the plurality of pixel electrodes to be determined such that a difference in voltage to be applied to each of two pixel electrodes in alignment is greater than or equal to a predetermined value and that a reverse tilt domain occurs, and to correct the input image signal to reduce a difference in the voltage to be applied in a specified set of pixel electrodes; and a driving unit configured to apply a voltage to the plurality of pixel electrodes based on the input image signal corrected by the correction unit. The correction unit is configured to: correct, when two pixel electrodes included in the specified set of pixel electrodes are aligned in the second direction, the input image signal to increase a decreased amount of a difference in the applied voltage in comparison with correction performed when the two pixel electrodes are aligned in the first direction, and correct, when two pixel electrodes included in the specified set of pixel electrodes are aligned in the first direction, the input image signal to reduce the decreased amount of the difference in the applied voltage in comparison with correction performed when the two pixel electrodes are aligned in the second direction.

According to the aspect, when two pixel electrodes included in the set of the pixel electrodes specified by the correction unit are aligned in the second direction, correction is performed to increase a decreased amount of the difference in the applied voltage. Thus, a tendency where a reverse tilt domain is visually identified in the second direction more easily than in the first direction can be suppressed. Further, when two pixel electrodes included in the set of the pixel electrodes specified by the correction unit are aligned in the first direction, correction is performed to reduce a decreased amount of the difference in the applied voltage. Thus, a change in a display state due to the correction can be suppressed.

One aspect of a liquid crystal display according to the disclosure includes a plurality of pixel electrodes arranged in a first direction and a second direction intersecting the first direction, an element substrate including the plurality of pixel electrodes, a counter substrate including a common electrode, a liquid crystal layer sandwiched between the element substrate and the counter substrate, a first light-shielding film extending in the first direction along a first side of the plurality of pixel electrodes, a second light-shielding film extending in the second direction along a second side of the plurality of pixel electrodes, a liquid crystal panel in which a width of the first light-shielding film is narrower than a width of the second light-shielding film, and a signal processing unit configured to apply a voltage to the plurality of pixel electrodes based on an input image signal. When an image signal is input as the input image signal for displaying a pixel corresponding to a first pixel electrode of the plurality of pixel electrodes at a first gray level and for displaying pixel corresponding to another remaining pixel electrodes at a second gray level lower than the first gray level, or when an image signal is input as the input image signal for displaying a pixel corresponding to a first pixel electrode of the plurality of pixel electrodes at a third gray level and for displaying pixel corresponding to another remaining pixel electrodes at a fourth gray level higher than the third gray level, the signal processing unit is configured to correct the input image signal, and to apply the voltage to the plurality of pixel electrodes in such a way that a first applied voltage difference is smaller than a second applied voltage difference, a third applied voltage difference is smaller than a fourth applied voltage difference, and the third applied voltage difference is smaller than the first applied voltage difference. The first applied voltage difference is a difference in applied voltage between the first pixel electrode and a second pixel electrode aligned on a side where a reverse tilt domain easily occurs in the first direction with respect to the first pixel electrode. The second applied voltage difference is a difference in applied voltage between the first pixel electrode and a third pixel electrode aligned on a side where a reverse tilt domain hardly occurs in the first direction with respect to the first pixel electrode. The third applied voltage difference is a difference in applied voltage between the first pixel electrode and a fourth pixel electrode aligned on the side where the reverse tilt domain easily occurs in the second direction with respect to the first pixel electrode. The fourth applied voltage difference is a difference in applied voltage between the first pixel electrode and a fifth pixel electrode aligned on the side where the reverse tilt domain hardly occurs in the second direction with respect to the first pixel electrode.

According to the aspect, the third applied voltage difference is made to be smaller than the first applied voltage difference, so that a tendency where a reverse tilt domain is visually identified in the second direction more easily than in the first direction can be suppressed.

One aspect of a liquid crystal display according to the disclosure includes a plurality of pixel electrodes arranged in a first direction and a second direction intersecting the first direction, an element substrate including the plurality of pixel electrodes, a counter substrate including a common electrode, a liquid crystal layer sandwiched between the element substrate and the counter substrate, a first light-shielding film extending in the first direction along a first side of the plurality of pixel electrodes, a second light-shielding film extending in the second direction along a second side of the plurality of pixel electrodes, a liquid crystal panel in which a width of the first light-shielding film is narrower than a width of the second light-shielding film, and a signal processing unit configured to apply a voltage to the plurality of pixel electrodes based on an input image signal. When an image signal is input as the input image signal for displaying a pixel corresponding to a first pixel electrode of the plurality of pixel electrodes at a first gray level and for displaying pixel corresponding to another remaining pixel electrodes at a second gray level lower than the first gray level, or when an image signal is input as the input image signal for displaying a pixel corresponding to a first pixel electrode of the plurality of pixel electrodes at a third gray level and for displaying pixel corresponding to another remaining pixel electrodes at a fourth gray level higher than the third gray level, the signal processing unit is configured to correct the input image signal, and to apply the voltage to the plurality of pixel electrodes in such a way that a first transmittance difference is smaller than a second transmittance difference, a third transmittance difference is smaller than a fourth transmittance difference, and the third transmittance difference is smaller than the first transmittance difference. The first transmittance difference is a difference in transmittance between a pixel corresponding to the first pixel electrode and a pixel corresponding to a second pixel electrode aligned with the first pixel electrode on a side where a reverse tilt domain easily occurs in the first direction. The second transmittance difference is a difference in transmittance between the pixel corresponding to the first pixel electrode and a pixel corresponding to a third pixel electrode aligned with the first pixel electrode on a side where a reverse tilt domain hardly occurs in the first direction. The third transmittance difference is a difference in transmittance between the pixel corresponding to the first pixel electrode and a pixel corresponding to a fourth pixel electrode aligned with the first pixel electrode on the side where a reverse tilt domain easily occurs in the second direction. The fourth transmittance difference is a difference in transmittance between the pixel corresponding to the first pixel electrode and a pixel corresponding to a fifth pixel electrode aligned with the first pixel electrode on the side where a reverse tilt domain hardly occurs in the second direction.

According to the aspect, the third transmittance difference is made to be smaller than the first transmittance difference, so that a tendency where a reverse tilt domain is visually identified in the second direction more easily than in the first direction can be suppressed.

One aspect of an electronic device according to the disclosure includes the above-mentioned liquid crystal display.

According to the aspect, the electronic device includes the above-mentioned liquid crystal display, so that a tendency where a reverse tilt domain is visually identified in the second direction more easily than in the first direction can be suppressed.

BRIEF DESCRIPTION OF THE DRAWINGS

The disclosure will be described with reference to the accompanying drawings, wherein like numbers reference like elements.

DESCRIPTION OF EXEMPLARY
EMBODIMENTS

Some exemplary embodiments of this disclosure will be described below in detail with reference to accompanying drawings. However, dimensions and a scale of each unit in each of the drawings are different from actual dimensions and scale as appropriate. Further, some exemplary embodiments described below are some specific examples of the disclosure, so that various limitations are technically provided. However, a scope of the disclosure is not limited to the exemplary embodiments unless limitations on the disclosure are particularly described in the following description.

First Exemplary Embodiment

Figure 1:
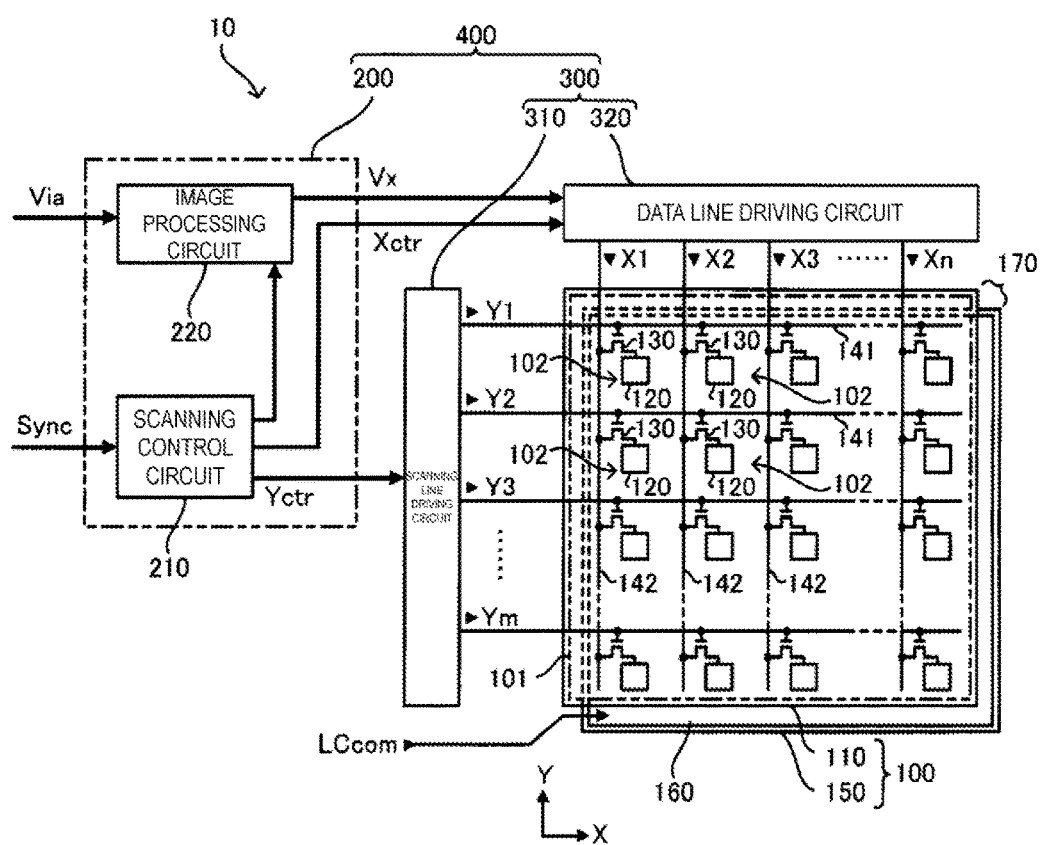
FIG. 1 is a block diagram illustrating a general arrangement of a liquid crystal display according to some exemplary embodiments.

A liquid crystal display 10 according to a first exemplary embodiment of the disclosure will be described. First, a general arrangement of the liquid crystal display 10 will be described. FIG. 1 is a block diagram illustrating the general arrangement of the liquid crystal display 10. The liquid crystal display 10 includes a liquid crystal panel 100 and a signal processing unit 400.

The liquid crystal panel 100 includes an element substrate 110, a counter substrate 150, and a liquid crystal layer 170. The element substrate 110 and the counter substrate 150 are bonded together while maintaining a certain gap. The liquid crystal layer 170 is sandwiched between the element substrate 110 and the counter substrate 150. In a display region 101 of the liquid crystal panel 100, a plurality of pixels 102 is arranged in a horizontal direction (X direction) and a vertical direction (Y direction). An arrangement of the pixels 102 aligned in the X direction is referred to as a row, and an arrangement of the pixels 102 aligned in the Y direction is referred to as a column.

The element substrate 110 includes a pixel electrode 120, a thin film transistor (TFT) 130, a scanning line 141, and a data line 142. The pixel electrode 120 and the TFT 130 are provided for every pixel 102. Each of the pixel electrodes 120 includes a translucent conductive material and has a rectangular shape with one pair of sides extending in the longitudinal direction (X direction) and one pair of sides extending in the column direction (Y direction).

The scanning line 141 includes a wire that is provided for every row of the pixels 102, is disposed between adjacent rows of the pixels 102, extends in the longitudinal direction (X direction), and is formed of a translucent conductive material. The data line 142 includes a wire that is provided for every column of the pixels 102, is disposed between adjacent columns of the pixels 102, extends in the column direction (Y direction), and is formed of a translucent conductive material. In each of the TFTs 130, a gate electrode is electrically connected to the scanning line 141, a source electrode is electrically connected to the data line 142, and a drain electrode is electrically connected to the pixel electrode 120.

The counter substrate 150 includes a common electrode 160. The common electrode 160 includes a translucent conductive material and is formed across the entire surface of the counter substrate 150. A voltage LCcom is applied to the common electrode 160. In this example, it is assumed that the voltage LCcom is 0 V. The liquid crystal layer 170 includes liquid crystals having positive or negative dielectric anisotropy. The liquid crystal panel 100 is configured to operate in, for example, a twisted nematic (TN) mode or a vertical alignment (VA) mode. An alignment film is formed in each of the element substrate 110 and the counter substrate 150 to control an alignment orientation of the liquid crystals. The liquid crystal panel 100 is used as a display device while being sandwiched between a polarizing plate disposed outside the element substrate 110 and a polarizing plate disposed outside the counter substrate 150.

The signal processing unit 400 includes a controller 200 and a driving unit 300. As described below, the signal processing unit 400 is configured to apply a voltage to the plurality of pixel electrodes 120 based on an input image signal Via (hereinafter also referred to as an image signal). The image signal Via in synchronization with a synchronization signal Sync is supplied from a host device to the controller 200. The image signal Via is digital data for specifying a gray level of each of the pixels 102 in the liquid crystal panel 100, and is supplied in scanning order according to a vertical scanning signal, a horizontal scanning signal, and a dot clock signal included in the synchronization signal Sync. The image signal Via is configured to specify a gray level, and an applied voltage to the pixel electrode 120 in each of the pixels 102 is determined according to the gray level. Thus, the image signal Via may be perceived as a signal for specifying an applied voltage to the pixel electrode 120.

The controller 200 includes a scanning control circuit 210 and an image processing circuit 220. The scanning control circuit 210 is configured to generate various control signals, and also to synchronize with the synchronization signal Sync and control each unit. The image processing circuit 220 is configured to process the digital image signal Via and output an analog image signal Vx. Further, the image processing circuit 220 is configured to correct the image signal Via. Details of the image processing circuit 220 will be described later.

The driving unit 300 includes a scanning line driving circuit 310 and a data line driving circuit 320. The scanning line driving circuit 310 is configured to supply scanning signals Y1, Y2, Y3, . . . , and Ym to the scanning lines 141 according to a control signal Yctr provided from the scanning control circuit 210. The data line driving circuit 320 is configure to supply data signals X1, X2, X3, . . . , and Xn to the data lines 142 according to a control signal Xctr provided from the scanning control circuit 210. The data signals X1, X2, X3, . . . , and Xn are generated based on the image signal Vx supplied from the image processing circuit 220.

When the TFTs 130 are brought into an ON state at predetermined timing in response to the scanning signals Y1, Y2, Y3, . . . , and Ym, the data signals X1, X2, X3, . . . , and Xn are written to the pixel electrodes 120. In other words, a voltage corresponding to the data signal is applied to the pixel electrode 120. The written data signal is held in a predetermined period of time in a liquid crystal capacitance formed between the pixel electrode 120 and the common electrode 160. Note that a storage capacitance may be provided in each of the pixels 102 to suppress a leak of a written data signal.

In this way, a voltage is applied to the pixel electrode 120 in each of the pixels 102, and an alignment state of the liquid crystal layer 170 changes according to a level of the applied voltage, so that light incident on the liquid crystal layer 170 is modulated, and gradation display can be achieved.

Figure 2:
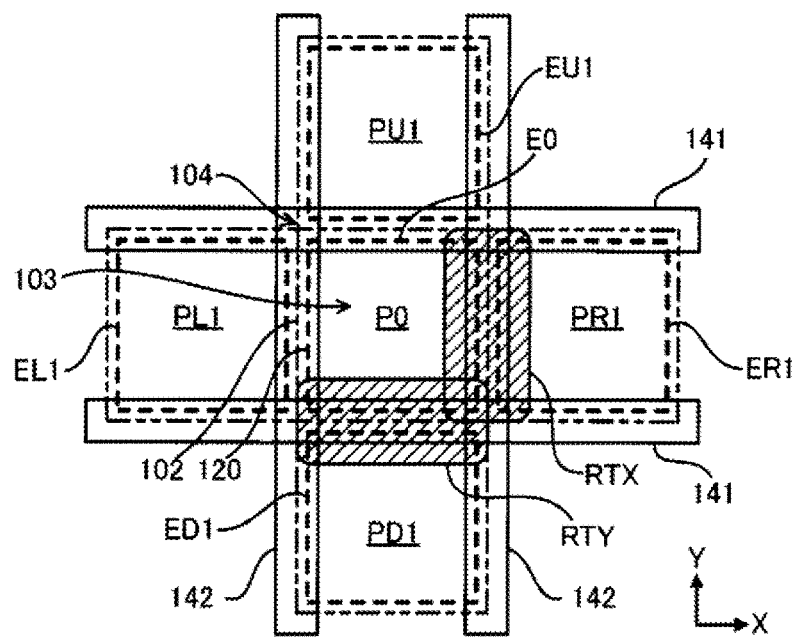
FIG. 2 is a schematic plan view illustrating an arrangement of pixels.

Next, details of a structure of the liquid crystal panel 100 will be described. A reverse tilt domain occurring in the liquid crystal layer 170 will also be described. Operations in a normally black mode will be described below. FIG. 2 is a schematic plan view illustrating an arrangement of the pixels 102. A view of the liquid crystal panel 100 from a direction vertical to the surface of the pixel electrode 120 or a direction vertical to the surface of the common electrode 160 is referred to as a plan view.

FIG. 2 illustrates a pixel P0, a pixel PR1 adjacent to one side (right side of the paper plane) in the X direction with respect to the pixel P0, a pixel PL1 adjacent to the other side (left side of the paper plane) in the X direction with respect to the pixel P0, a pixel PD1 adjacent to one side (under side of the paper plane) in the Y direction with respect to the pixel P0, and a pixel PU1 adjacent to the other side (upper side of the paper plane) in the Y direction with respect to the pixel P0. Pixel electrodes E0, ER1, EL1, ED1, and EU1 are provided in the pixels P0, PR1, PL1, PD1, and PU1, respectively. An outline of the pixels P0, PR1, PL1, PD1, and PU1 is indicated by a chain double-dashed line, and an outline of the pixel electrodes E0, ER1, EL1, ED1, and EU1 is indicated by a dashed line.

In the example illustrated in FIG. 2, the pixel P0 is displayed at the highest gray level that can be expressed. In other words, the highest voltage (for example, 5 V) that can be applied is applied to the pixel electrode E0. The other remaining pixels PR1, PL1, PD1, and PU1 are displayed at the lowest gray level that can be expressed. In other words, the lowest voltage (for example, 0 V) that can be applied is applied to the pixel electrodes ER1, EL1, ED1, and EU1. Note that an applied voltage corresponding to the highest gray level that can be expressed may vary according to operation modes of the liquid crystal display 10. For example, an applied voltage corresponding to the highest gray level that can be expressed in a certain operation mode may be 5 V, and an applied voltage corresponding to the highest gray level that can be expressed in another operation mode may be 4 V.

In a technology according to a liquid crystal display, a reverse tilt domain (hereinafter also referred to as a domain) being a region having irregular alignment of liquid crystals has been known to occur in a shape mostly along an adjacent side due to an increasing difference (lateral electric field) in applied voltage between adjacent pixel electrodes. However, even when the lateral electric field has an identical size, the domain tends to easily occur on a side of pixel electrodes adjacent in a certain direction, and the domain tends to hardly occur on a side of pixel electrodes adjacent in an opposite direction. Note that occurrence of the domain does not cause an issue between pixel electrodes disposed in a skew direction.

The example in FIG. 2 illustrates a situation where although a great lateral electric field is similarly generated between the pixel electrode E0 and each of the pixel electrodes ER1 and EL1 adjacent to the pixel electrode E0 in the X direction, a domain RTX occurs on the pixel electrode ER1 side while no domain occurs on the pixel electrode EL1 side. The example in FIG. 2 also illustrates a situation where although a great lateral electric field is similarly generated between the pixel electrode E0 and each of the pixel electrodes ED1 and EU1 adjacent to the pixel electrode E0 in the Y direction, a domain RTY occurs on the pixel electrode ED1 side while no domain occurs on the pixel electrode EU1 side. The domains RTX and RTY are indicated by hatching diagonally to the upper right. The domains RTX and RTY are easily visually identified as a region having brightness decreased in the pixel P0 displayed at a high gray level.

The scanning line 141 is disposed on a boundary between the pixels 102 adjacent to each other in the Y direction. The scanning line 141 is provided to have a width overlapping an upper end portion of a pixel electrode 120 provided in a lower pixel 102 of the pixels 102 adjacent to each other in the Y direction and a lower end portion of a pixel electrode 120 provided in an upper pixel 102. The data line 142 is disposed on a boundary between the pixels 102 adjacent to each other in the X direction. The data line 142 is provided to have a width overlapping a left end portion of a pixel electrode 120 provided in a right pixel 102 of the pixels 102 adjacent to each other in the X direction and a right end portion of a pixel electrode 120 provided in a left pixel 102.

The scanning line 141 forms a light-shielding film extending in the X direction along a side of the pixel electrode 120 extending in the X direction. The data line 142 intersects the scanning line 141 in the planar view. The data line 142 forms a light-shielding film extending in the Y direction along a side of the pixel electrode 120 extending in the Y direction. A region inside the pixel electrode 120 (the pixel 102) surrounded by the scanning lines 141 and the data lines 142 in the planar view is an opening region (translucent region) 103 through which light passes. On the other hand, a region in which the scanning line 141 or the data line 142 is provided in the planar view is a non-opening region (light-shielding region) 104 in which light is shielded at a boundary region between the pixels 102.

Figure 3:
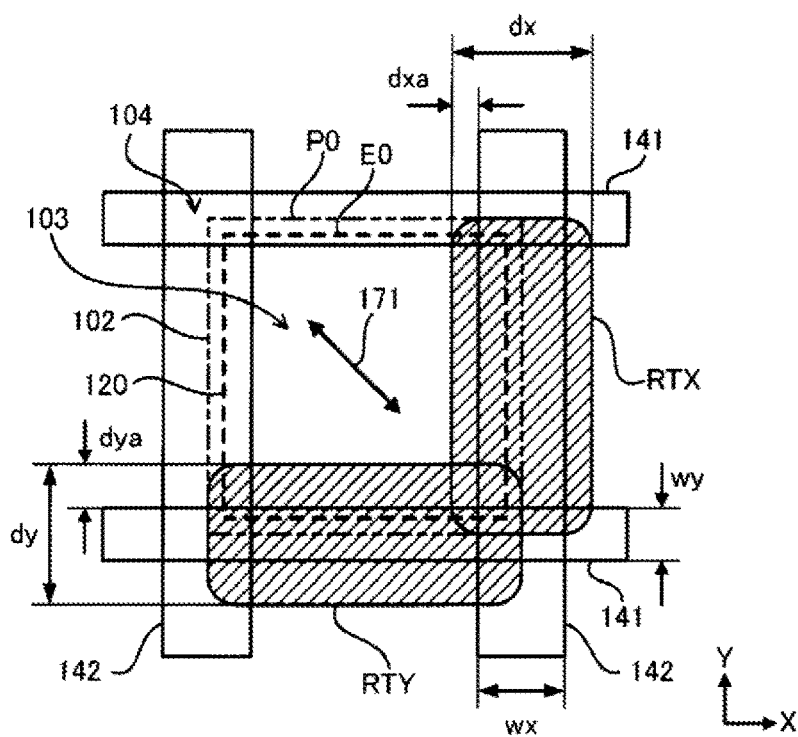
FIG. 3 is a schematic plan view illustrating an enlarged view of the vicinity of one pixel in a first exemplary embodiment.

FIG. 3 is a schematic plan view illustrating an enlarged view of the vicinity of the pixel P0 in FIG. 2. In the first exemplary embodiment, the scanning line 141 and the data line 142 of the liquid crystal panel 100 are provided such that a width (dimensions in the Y direction) of the scanning line 141 is narrower than a width (dimensions in the X direction) of the data line 142.

The domain RTX occurs along a side of the pixel electrode E0 extending in the Y direction between the pixel electrode E0 and the pixel electrode ER1 adjacent to each other in the X direction (in the vicinity of sides of the pixel electrodes E0 and ER1 facing each other). It is assumed that a width (dimensions in the X direction) of the domain RTX is dx. The domain RTY occurs along a side of the pixel electrode E0 extending in the X direction between the pixel electrode E0 and the pixel electrode ED1 adjacent to each other in the Y direction (in the vicinity of sides of the pixel electrodes E0 and ED1 facing each other). It is assumed that a width (dimensions in the Y direction) of the domain RTY is dy.

An alignment orientation 171 of the liquid crystals in the liquid crystal layer 170 is along a direction that divides an angle formed between the side of the pixel electrode E0 along the domain RTX and the side of the pixel electrode E0 along the domain RTY, and forms 45° with each of the X direction and the Y direction. The alignment orientation 171 of the liquid crystals is set so as to form an equal angle (namely, 45°) with each of the X direction and the Y direction. In this way, the domain RTX generated between the pixels 102 adjacent to each other in the X direction and the domain RTY generated between the pixels 102 adjacent to each other in the Y direction occur under an identical condition. As a result, the width dx of the domain RTX and the width dy of the domain RTY are equal.

Because a width wy of the scanning line 141 is narrower than a width wx of the data line 142, a width dya of the domain RTY protruding to the opening region 103 of the pixel P0 is wider than a width dxa of the domain RTX protruding to the opening region 103 of the pixel P0. Thus, the domain RTY is visually identified more easily than the domain RTX in the opening region 103 of the pixel P0.

Note that as understood from the description above, when the scanning line 141 and the data line 142 are provided such that the width wx of the data line 142 is smaller than the width wy of the scanning line 141, contrary to the example in FIG. 3, the domain RTX is visually identified more easily than the domain RTY.

In other words, a domain (the domain RTY in the example in FIG. 3) occurring in the vicinity of a (narrow) light-shielding film (the scanning line 141 in the example in FIG. 3) having a relatively narrow width is visually identified more easily than a domain (the domain RTX in the example in FIG. 3) occurring in the vicinity of a (wide) light-shielding film (the data line 142 in the example in FIG. 3) having a relatively wide width. A width direction of the narrow light-shielding film (Y direction being a width direction of the scanning line 141 in the example in FIG. 3) is a direction in which a domain (the domain RTY in the example in FIG. 3) is visually identified more easily than a width direction of the wide light-shielding film (X direction being a width direction of the data line 142 in the example in FIG. 3).

As described later in detail, the liquid crystal display 10 according to the first exemplary embodiment is configured to correct the image signal Via input to the image processing circuit 220 by the image processing circuit 220 and thus suppress occurrence of a domain. Then, in the correction, the liquid crystal display 10 is configured to perform stronger correction in a direction in which a domain is easily visually identified corresponding to a width direction of a narrow light-shielding film of intersecting light-shielding films. Thus, the liquid crystal display 10 is configured to suppress a tendency where a domain occurring in the vicinity of the narrow light-shielding film is easily visually identified.

Figure 4:
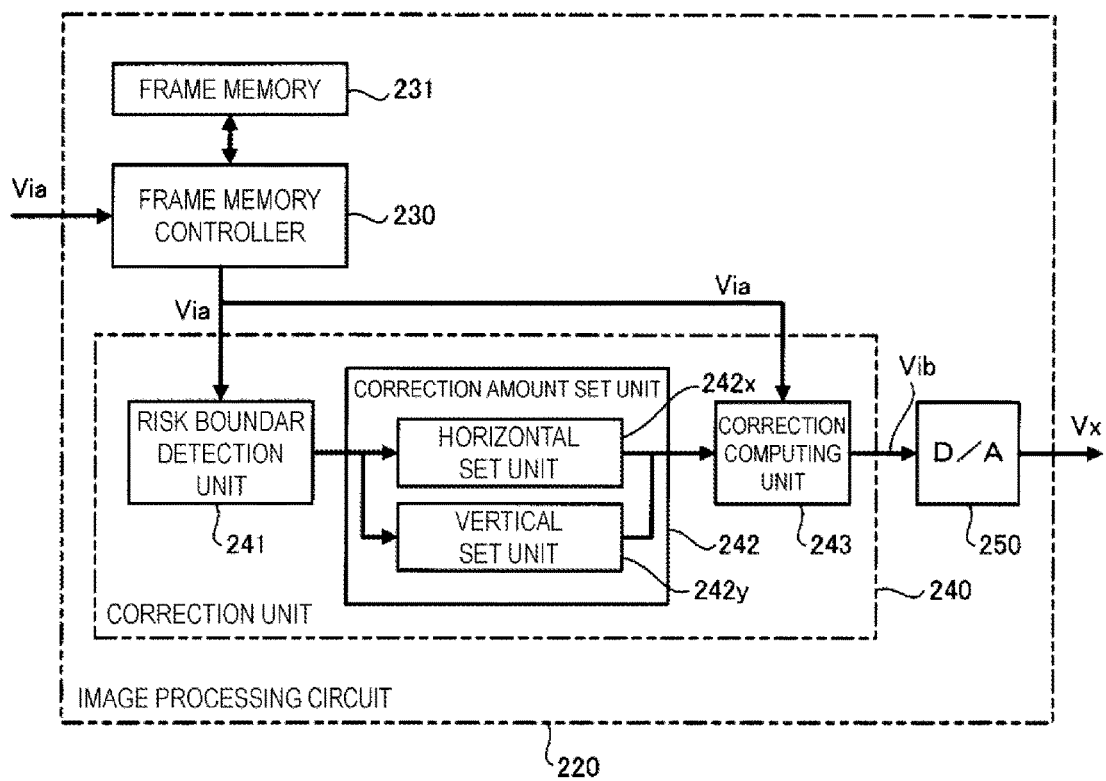
FIG. 4 is a block diagram illustrating a configuration of an image processing circuit.

Next, the image processing circuit 220 will be described. A correction example of the image signal Via by the image processing circuit 220 will also be described. FIG. 4 is a block diagram exemplifying a configuration of the image processing circuit 220. The exemplified image processing circuit 220 includes a frame memory controller (FMC) 230, a frame memory (FM) 231, a correction unit 240, and a digital analog (D/A) converter 250.

The image signal Via is supplied from a host device to the FMC 230 and stored in the FM 231 via the FMC 230. The image signal Via stored in the FM 231 is supplied to the correction unit 240 via the FMC 230.

The image signal Via is corrected by the correction unit 240. Thus, hereinafter, the image signal Via input to the correction unit 240 may be referred to as a pre-correction image signal Via, and an image signal Vib output from the correction unit 240 may be referred to as a post-correction image signal Vib. Note that as understood from the description described later, the pre-correction image signal Via is corrected so as to suppress occurrence of a domain. Therefore, when the pre-correction image signal Via is a signal that does not cause a domain (signal that does not include a set of the pixel electrodes 120 specified by a risk boundary detection unit 241 described later), the pre-correction image signal Via may not be corrected. When the pre-correction image signal Via is not corrected, the pre-correction image signal Via being the image signal Via input to the correction unit 240 may coincide with the post-correction image signal Vib being the image signal Vib output from the correction unit 240.

The pre-correction image signal Via determines a voltage to be applied to the pixel electrode 120 provided in each of the pixels 102 by determining a gray level of each of the pixels 102. Herein, a "voltage to be applied" to a certain pixel electrode 120 indicates an applied voltage corresponding to a gray level as it is specified by the pre-correction image signal Via. Therefore, when an applied voltage to the pixel electrode 120 is corrected in the post-correction image signal Vib, an actual applied voltage is a value different from the "voltage to be applied".

The correction unit 240 includes a risk boundary detection unit 241, a correction amount set unit 242, and a correction computing unit 243. The pre-correction image signal Via is supplied to the risk boundary detection unit 241. The risk boundary detection unit 241 is configured to specify, based on the pre-correction image signal Via, a set of the pixel electrodes 120 determined such that a difference in voltage to be applied to each of two aligned (adjacent) pixel electrodes 120 is greater than or equal to a predetermined value and that a domain occurs. In other words, a boundary between the two pixel electrodes 120 included in the speci- fied set of the pixel electrodes 120, that is, a boundary between the pixels 102 corresponding to these pixel electrodes 120 is detected as a boundary (risk boundary) in which a domain occurs.

Figure 5:
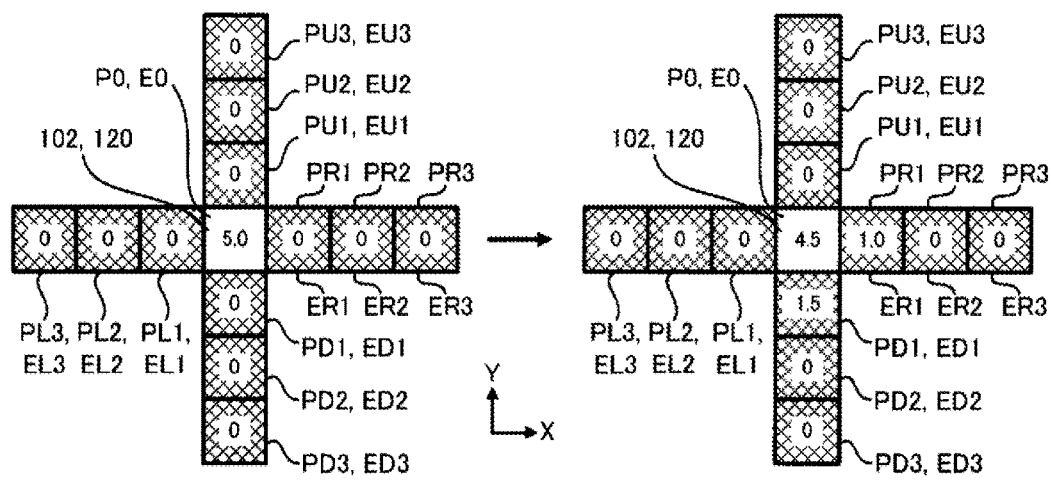
FIG. 5 is a schematic plan view illustrating an arrangement of pixels in a correction example 1.

Description continues with reference to FIG. 5 in addition to FIG. 4. FIG. 5 is a schematic plan view of an arrangement of the pixels 102 that illustrates a correction example 1 of the image signal Via. A left portion of FIG. 5 illustrates an applied voltage (namely, a "voltage to be applied") corresponding to the pre-correction image signal Via, and a right portion of FIG. 5 illustrates an applied voltage corresponding to the post-correction image signal Vib. An applied voltage is expressed in units V in each of the pixels 102.

As illustrated in the left portion of FIG. 5, the applied voltage corresponding to the pre-correction image signal Via is identical to the applied voltage in the example illustrated in FIG. 2. FIG. 5 additionally illustrates a pixel PR2 and a pixel PR3 respectively disposed two and three pixels away from the pixel P0 toward the right in the X direction, a pixel PL2 and a pixel PL3 respectively disposed two and three pixels away from the pixel P0 toward the left in the X direction, a pixel PD2 and a pixel PD3 respectively disposed two and three pixels away from the pixel P0 toward the bottom in the Y direction, and a pixel PU2 and a pixel PU3 respectively disposed two and three pixels away from the pixel P0 toward the top in the Y direction. Pixel electrodes E0, ER1 to ER3, EL1 to EL3, ED1 to ED3, and EU1 to EU3 are provided in the pixels P0, PR1 to PR3, PL1 to PL3, PD1 to PD3, and PU1 to PU3, respectively. The pixel P0 having a voltage to be applied of 5 V and being displayed at a high gray level is indicated in white. Further, the pixels PR1 to PR3, PL1 to PL3, PD1 to PD3, and PU1 to PU3 having a voltage to be applied of 0 V and being displayed at a low gray level are indicated by cross-hatching.

In the example illustrated in FIG. 5, the risk boundary detection unit 241 is configured to specify a set of the pixel electrodes 120 as follows. A predetermined value of a difference in voltage to be applied is, for example, 4.0 V. As a set of the pixel electrodes 120 determined such that a difference in voltage to be applied to each of two aligned pixel electrodes 120 is higher than or equal to 4.0 V and that a domain occurs, two sets including a set of the pixel electrodes E0 and ER1 and a set of the pixel electrodes E0 and ED1 are specified. A set of the pixel electrodes 120 aligned in the X direction like the set of the pixel electrodes E0 and ER1 is referred to as a set in the X direction, and a set of the pixel electrodes 120 aligned in the Y direction like the set of the pixel electrodes E0 and ED1 is referred to as a set in the Y direction.

Note that although a difference in voltage to be applied to each of two aligned pixel electrodes 120 is greater than or equal to 4.0 V in a set of the pixel electrodes E0 and EL1 and a set of the pixel electrodes E0 and EU1, it is determined that a domain does not occur, as described with reference to FIG. 2. Thus, the set of the pixel electrodes E0 and EL1 and the set of the pixel electrodes E0 and EU1 are not a set of the pixel electrodes 120 specified by the risk boundary detection unit 241. Note that when a difference in voltage to be applied (lateral electric field) is great, how the pixel electrodes 120 are aligned in a set in which a domain occurs can be determined by an alignment orientation set in the liquid crystal layer 170.

Data indicating a set of the pixel electrodes 120 specified by the risk boundary detection unit 241 (hereinafter may be simply referred to as a set of the pixel electrodes 120) is input to the correction amount set unit (calculation unit) 242. The correction amount set unit 242 is configured to set (calculates) a correction amount of an applied voltage to two pixel electrodes 120 included in the set of the pixel electrodes 120 so as to reduce a difference in applied voltage in the set of the pixel electrodes 120. Note that a correction amount may be set as a gray level instead of a voltage value.

The correction amount set unit 242 includes a horizontal set unit 242x and a vertical set unit 242y. The horizontal set unit 242x is configurated to set a correction amount to a set of the pixel electrodes 120 being a set in the X direction (namely, the horizontal direction). The vertical set unit 242y is configured to set a correction amount to a set of the pixel electrodes 120 being a set in the Y direction (namely, the vertical direction).

In the example illustrated in FIG. 5, the correction amount set unit 242a is configured to set correction amount as follows. A correction amount is set to the set of the pixel electrodes E0 and ER1 being the set in the X direction by the horizontal set unit 242x. −0.5 V is set as a correction amount of the pixel electrode E0 having a voltage to be applied of 5 V. +1.0 V is set as a correction amount of the pixel electrode ER1 having a voltage to be applied of 0 V. In other words, 4.5 V is set as an applied voltage of the pixel electrode E0 after correction, and 1.0 V is set as an applied voltage of the pixel electrode ER1 after the correction. Therefore, a difference in applied voltage between the pixel electrodes E0 and ER1 is reduced from 5.0 V before the correction to 3.5 V after the correction, and a decreased amount of the difference in applied voltage by the correction is 1.5 V.

The vertical set unit 242y is configured to set a correction amount to the set of the pixel electrodes E0 and ED1 being the set in the Y direction by. −0.5 V is set as a correction amount of the pixel electrode E0 having a voltage to be applied of 5 V. +1.5 V is set as a correction amount of the pixel electrode ED1 having a voltage to be applied of 0 V. In other words, 4.5 V is set as an applied voltage of the pixel electrode E0 after the correction. 1.5 V is set as an applied voltage of the pixel electrode ED1 after the correction. Therefore, a difference in applied voltage between the pixel electrodes E0 and ED1 is reduced from 5.0 V before the correction to 3.0 V after the correction, and a decreased amount of the difference in applied voltage by the correction is 2.0 V.

Data indicating a correction amount set to a set of the pixel electrodes 120 by the correction amount set unit 242 is input to the correction computing unit 243. The pre-correction image signal Via is supplied from the FMC 230 to the correction computing unit 243. The correction computing unit 243 is configured to use the data indicating the correction amount to the set of the pixel electrodes 120 to correct the pre-correction image signal Via and generate the post-correction image signal Vib. The post-correction image signal Vib is converted into the analog image signal Vx by the D/A converter 250, and the image signal Vx is then supplied to the driving unit 300 (data line driving circuit 320).

In the example illustrated in FIG. 5, the correction amount computing unit 243 is configured to generate the post-correction image signal Vib as follows. As illustrated in the right portion of FIG. 5, the post-correction image signal Vib is a signal indicating an applied voltage of 0 V similarly to the pre-correction image signal Via for the pixel electrodes ER2, ER3, EL1 to EL3, ED2, ED3, and EU1 to EU3. In other words, the pixels corresponding to these pixel electrodes have not been corrected. Further, the post-correction image signal Vib is a signal indicating an applied voltage of 4.5 V, 1.0 V, and 1.5 V respectively for the pixel electrodes E0, ER1, and ED1 that have been corrected from the pre-correction image signal Via as mentioned above.

As described above, in the exemplary embodiment, the applied voltage of the pixel electrodes E0, ER1, and ED1 is corrected to decrease a difference in the applied voltage between the pixel electrodes E0 and ER1 by 1.5 V and decrease a difference in the applied voltage between the pixel electrodes E0 and ED1 by 2.0 V. In this way, the pre-correction image signal Via is corrected so as to reduce a difference in applied voltage in a specified set of the pixel electrodes 120, and the post-correction image signal Vib is generated. The liquid crystal panel 100 is then driven by the post-correction image signal Vib, so that occurrence of a domain can be suppressed.

Also, in the first exemplary embodiment, while a difference in voltage to be applied is equal to the set of the pixel electrodes E0 and ED1 and the set of the pixel electrodes E0 and ER1, a decreased amount of a difference in applied voltage in the set of the pixel electrodes E0 and ED1 is 2.0 V, which is greater than a decreased amount of 1.5 V of a difference in applied voltage in the set of the pixel electrodes E0 and ER1. In other words, when two pixel electrodes 120 included in a specified set of the pixel electrodes 120 are aligned in the Y direction, stronger correction is performed so as to increase a decreased amount of a difference in applied voltage than correction performed when two pixel electrodes 120 are aligned in the X direction.

In this way, occurrence of the domain RTY that is easily visually identified can be suppressed more strongly than occurrence of the domain RTX. In other words, the width dy of the domain RTY can be made to be narrower than the width dx of the domain RTX. Therefore, a tendency where the domain RTY occurring in the vicinity of the scanning line 141 being a narrow light-shielding film is easily visually identified (a tendency where a domain in the Y direction is easily visually identified) can be suppressed.

In other words, in the first exemplary embodiment, when two pixel electrodes 120 included in a specified set of the pixel electrodes 120 are aligned in the X direction, correction is performed so as to reduce a decreased amount of a difference in applied voltage in comparison with correction performed when two pixel electrodes 120 are aligned in the Y direction.

In this way, a correction amount of applied voltage for suppressing occurrence of the domain RTX that occurs in the vicinity of the data line 142 and is hardly visually identified can be reduced. Due to a change in applied voltage to the pixel electrode 120, a display state (transmittance) of the corresponding pixel 102 changes. Therefore, a correction amount of applied voltage may be small (not too excessive) in terms of maintaining display quality. In this way, a change in display state due to correction can be suppressed by reducing a correction amount of applied voltage.

Figure 6:
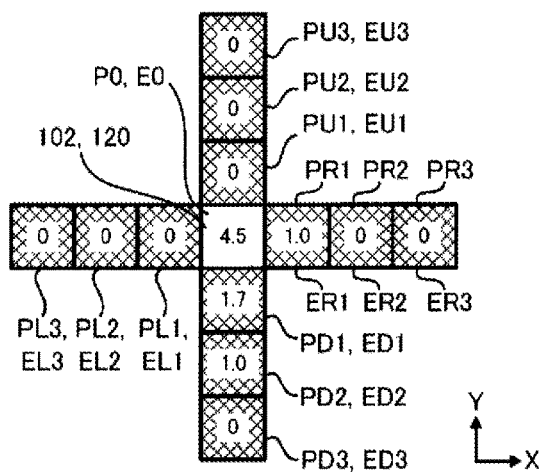
FIG. 6 is a schematic plan view illustrating an arrangement of pixels in a correction example 2.

Another correction example of the pre-correction image signal Via will be described below. First, a correction example 2 will be described. FIG. 6 is a schematic plan view of an arrangement of the pixels 102 that illustrates the correction example 2. The applied voltage corresponding to the pre-correction image signal Via is identical to the applied voltage in the left portion in FIG. 5. FIG. 6 illustrates an applied voltage corresponding to the post-correction image signal Vib in the correction example 2.

A difference between the correction example 1 and the correction example 2 will be described. While the corrected applied voltage of the pixel electrode ED1 is 1.5 V in the correction example 1, the corrected applied voltage of the pixel electrode ED1 is increased to 1.7 V in the correction example 2. In other words, stronger correction is performed by further reducing a difference in applied voltage between the pixel electrodes E0 and ED1.

Further, while the applied voltage of the pixel electrode ED2 is 0 V without correction in the correction example 1, an applied voltage of the pixel electrode ED2 being also corrected is 1.0 V in the correction example 2. The reason is that a difference in applied voltage between the pixel electrodes ED1 and ED2 is excessively increased due to a further increase in the applied voltage of the pixel electrode ED1 and occurrence of a domain is thus suppressed. In other words, the reason is that a change in voltage from the pixel electrode ED1 to the pixel electrode ED3 having an applied voltage not corrected from 0 V is made to be gradual.

As a result, in the correction example 2, the number of (three) pixel electrodes 120 having an applied voltage corrected in a direction in which a domain is easily visually identified (the Y direction in this example) is greater than the number of (two) pixel electrodes 120 having an applied voltage corrected in a direction in which a domain is hardly visually identified (the X direction in this example).

Figure 7:
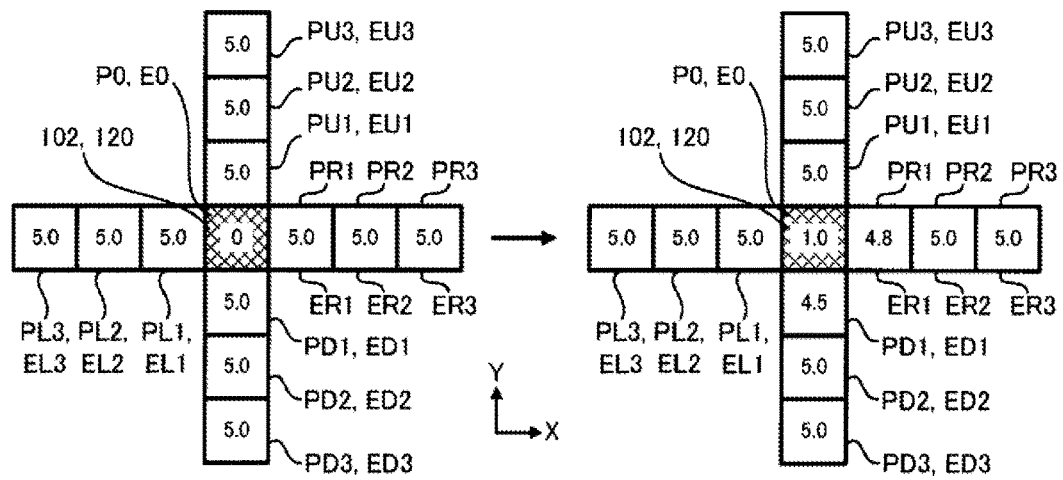
FIG. 7 is a schematic plan view illustrating an arrangement of pixels in a correction example 3.

Next, a correction example 3 will be described. FIG. 7 is a schematic plan view of an arrangement of the pixels 102 that illustrates the correction example 3. A left portion of FIG. 7 illustrates an applied voltage (namely, a "voltage to be applied" corresponding to the pre-correction image signal Via, and a right portion of FIG. 7 illustrates an applied voltage corresponding to the post-correction image signal Vib.

An applied voltage corresponding to the pre-correction image signal Via is 0 V for the pixel electrode E0 and is 5 V for the other remaining pixel electrodes ER1 to ER3, EL1 to EL3, ED1 to ED3, and EU1 to EU3. A set of the pixel electrodes E0 and ER1 and a set of the pixel electrodes E0 and ED1 are specified by the risk boundary detection unit 241.

The correction amount set unit 242 is configured to set +1.0 V as a correction amount of the pixel electrode E0, to set −0.2 V as a correction amount of the pixel electrode ER1, and to set −0.5 V as a correction amount of the pixel electrode ED1. In other words, 1.0 V is set as an applied voltage of the pixel electrode E0 after correction, 4.8 V is set as an applied voltage of the pixel electrode ER1 after the correction, and 4.5 V is set as an applied voltage of the pixel electrode ED1 after the correction. Therefore, a difference in applied voltage between the pixel electrodes E0 and ER1 is reduced from 5.0 V before the correction to 3.8 V after the correction, and a decreased amount of the difference in applied voltage by the correction is 1.2 V. Further, a difference in applied voltage between the pixel electrodes E0 and ED1 is reduced from 5.0 V before the correction to 3.5 V after the correction, and a decreased amount of the difference in applied voltage by the correction is 1.5 V.

Also in this example, strong correction is performed in a direction in which a domain is easily visually identified (the Y direction in this example) so as to increase a decreased amount of a difference in applied voltage, so that a tendency where a domain occurring in the vicinity of a narrow light-shielding film (the scanning line 141 in this example) can be suppressed.

Figure 8:
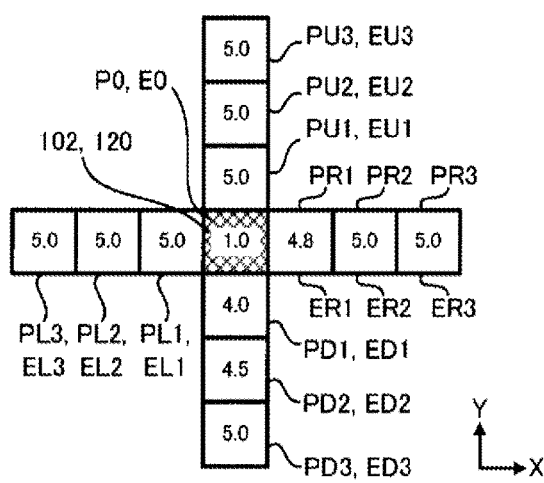
FIG. 8 is a schematic plan view illustrating an arrangement of pixels in a correction example 4.

Next, a correction example 4 will be described. FIG. 8 is a schematic plan view of an arrangement of the pixels 102 that illustrates the correction example 4. The applied voltage corresponding to the pre-correction image signal Via is identical to the applied voltage in the left portion in FIG. 7. FIG. 8 illustrates an applied voltage corresponding to the post-correction image signal Vib in the correction example 4.

A difference between the correction example 3 and the correction example 4 will be described. While the corrected applied voltage of the pixel electrode ED1 is 4.5 V in the correction example 3, the corrected applied voltage of the pixel electrode ED1 is reduced to 4.0 V in the correction example 4. In other words, stronger correction is performed by further reducing a difference in applied voltage between the pixel electrodes E0 and ED1.

Further, while the applied voltage of the pixel electrode ED2 is 5.0 V without correction in the correction example 3, an applied voltage of the pixel electrode ED2 being also corrected is 4.5 V in the correction example 4. The reason is that a difference in applied voltage between the pixel electrodes ED1 and ED2 is excessively increased due to a further reduction in the applied voltage of the pixel electrode ED1 and occurrence of a domain is thus suppressed. In other words, the reason is that a change in voltage from the pixel electrode ED1 to the pixel electrode ED3 having an applied voltage not corrected from 5.0 V is made to be gradual.

As a result, in the correction example 4, the number of (three) pixel electrodes 120 having an applied voltage corrected in a direction in which a domain is easily visually identified (the Y direction in this example) is greater than the number of (two) pixel electrodes 120 having an applied voltage corrected in a direction in which a domain is hardly visually identified (the X direction in this example).

Second Exemplary Embodiment

Figure 9:
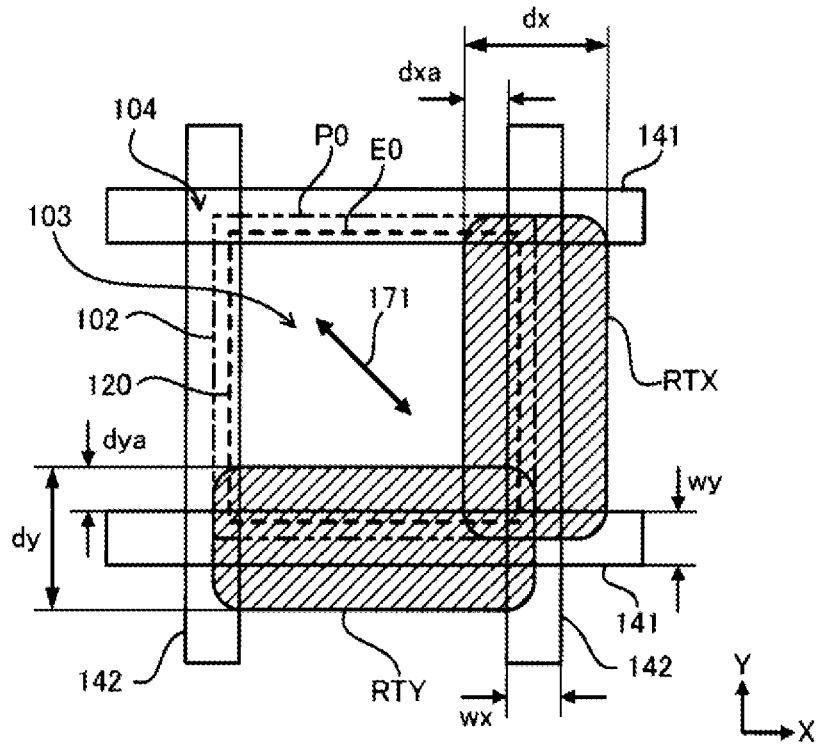
FIG. 9 is a schematic plan view illustrating an enlarged view of the vicinity of one pixel in a second exemplary embodiment.

Next, a liquid crystal display 10 according to a second exemplary embodiment will be described. FIG. 9 is a schematic plan view illustrating an enlarged view of the vicinity of the pixel P0 in a liquid crystal panel 100 of the liquid crystal display 10 in the second exemplary embodiment. The liquid crystal display 10 in the second exemplary embodiment is different from the liquid crystal display 10 in the first exemplary embodiment in that a width wy of the scanning line 141 of the liquid crystal panel 100 is equal to a width wx of the data line 142. The other points are identical to the first exemplary embodiment.

Because the width wy of the scanning line 141 is equal to the width wx of the data line 142 in the second exemplary embodiment, a width dya of the domain RTY protruding to the opening region 103 of the pixel P0 is equal to a width dxa of the domain RTX protruding to the opening region 103 of the pixel P0. Thus, ease of visual identification of a domain is identical in both of the X direction and the Y direction.

Figure 10:
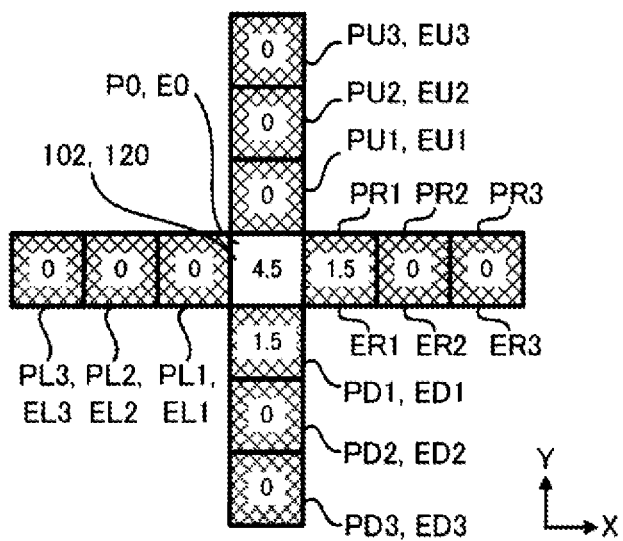
FIG. 10 is a schematic plan view illustrating an arrangement of pixels in a correction example 5.

FIG. 10 is a schematic plan view of an arrangement of the pixels 102 that illustrates a correction example 5 in the second exemplary embodiment. The applied voltage corresponding to the pre-correction image signal Via is identical to the applied voltage in the left portion in FIG. 5 in the first exemplary embodiment. FIG. 10 illustrates an applied voltage corresponding to the post-correction image signal Vib in the correction example 5.

The risk boundary detection unit 241 is configured to specify a set of the pixel electrodes E0 and ER1 and a set of the pixel electrodes E0 and ED1. The correction amount set unit 242 is configured to set −0.5 V as a correction amount of the pixel electrode E0, to set +1.5 V as a correction amount of the pixel electrode ER1, and to set +1.5 V as a correction amount of the pixel electrode ED1. In other words, 4.5 V is set as an applied voltage of the pixel electrode E0 after correction, 1.5 V is set as an applied voltage of the pixel electrode ER1 after the correction, and 1.5 V is set as an applied voltage of the pixel electrode ED1 after the correction. Therefore, a difference in applied voltage between the pixel electrodes E0 and ER1 is reduced from 5.0 V before the correction to 3.0 V after the correction, and a decreased amount of the difference in applied voltage by the correction is 2.0 V. Further, a difference in applied voltage between the pixel electrodes E0 and ED1 is reduced from 5.0 V before the correction to 3.0 V after the correction, and a decreased amount of the difference in applied voltage by the correction is 2.0 V.

Also in the second exemplary embodiment, the pre-correction image signal Via is corrected by the image processing circuit 220, so that occurrence of a domain can be suppressed. In the second exemplary embodiment, since the widths wx and wy of the scanning line 141 and the data line 142 are equal and ease of visual identification of a domain is identical in both of the X direction and the Y direction, an identical correction of an applied voltage may be performed in both of the X direction and the Y direction.

The disclosure is not limited to some exemplary embodiments mentioned above, and various modifications as mentioned below, for example, can be achieved. Further, one or a plurality of manners of modifications mentioned below, which are arbitrarily selected, can be combined as appropriate.

For example, some exemplary embodiments mentioned above exemplify the scanning line 141 as a light-shielding film extending in the X direction along a side of the pixel electrode 120, but such a light-shielding film is not limited to the scanning line 141 and may be provided in the element substrate 110 or the counter substrate 150. In addition, for example, some exemplary embodiments mentioned above exemplify the data line 142 as a light-shielding film extending in the Y direction along a side of the pixel electrode 120, but such a light-shielding film is not limited to the data line 142 and may be provided in the element substrate 110 or the counter substrate 150.

Note that some exemplary embodiments described above exemplify the simplified case where the light-shielding film (scanning line 141 and data line 142) defining the opening region 103 of the pixel 102 has a fixed width, but a width of such a light-shielding film may generally change according to a position. Thus, a width of the light-shielding film is defined as follows.

Figure 11:
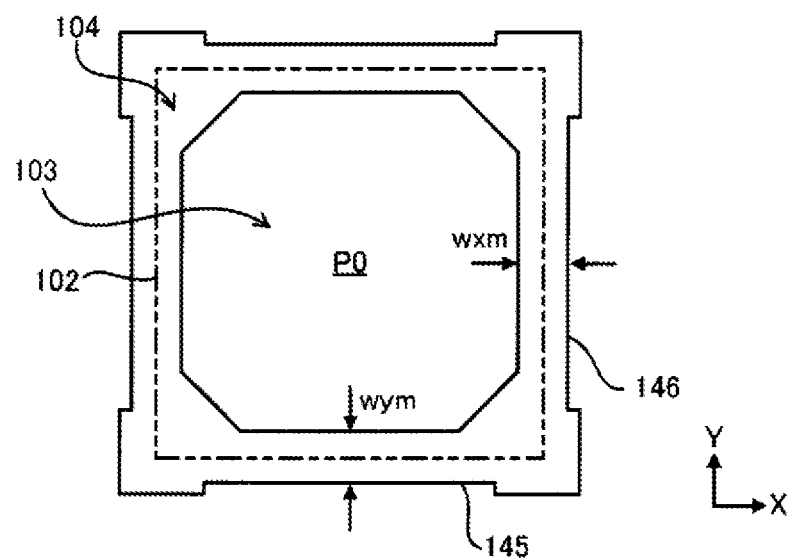
FIG. 11 is a schematic plan view illustrating light-shielding films of one pixel.

FIG. 11 is a schematic plan view illustrating an enlarged view of one pixel P0. A width of the light-shielding film 145 extending in the X direction is defined as the smallest width wym of the light-shielding film 145 on a side of the pixel P0 extending in the X direction. Further, a width of the light-shielding film 146 extending in the Y direction is defined as the smallest width wxm of the light-shielding film 146 on a side of the pixel P0 extending in the Y direction.

Note that the image signal Via may be an image signal forming a still image or may be a part of a plurality of image signals forming a moving image.

Note that the above-mentioned first exemplary embodiment mainly exemplifies the manner in which a direction (first direction) in which the narrow light-shielding film (first light-shielding film) extends is the X direction and a direction (second direction intersecting the first direction) in which the wide light-shielding film (second light-shielding film) extends is the Y direction. However, it may be a manner in which the narrow light-shielding film extends in the Y direction while the wide light-shielding film extends in the X direction. In a case of the manner in which the narrow light-shielding film extends in the Y direction, stronger correction is performed in the X direction in which a domain is easily visually identified.

Note that in the above-mentioned first exemplary embodiment, stronger correction is performed in a direction in which a domain is easily visually identified. In other words, correction is performed asymmetrically in a direction in which a domain is relatively easily visually identified and a direction in which a domain is not relatively easily visually identified. Thus, the liquid crystal display 10 according to one exemplary embodiment operates as follows in the following test, for example.

Figure 12:
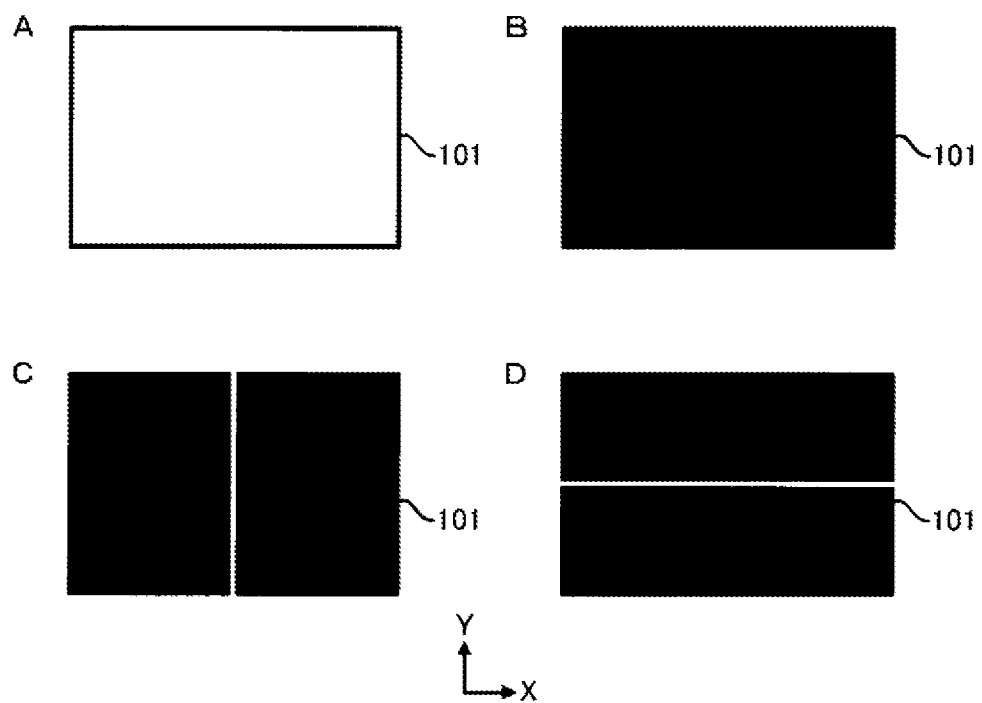
FIG. 12 is a schematic plan view of a display region illustrating an example of a test.

FIG. 12 is a schematic plan view of the display region 101 illustrating an example of a test. In the exemplified test, first, a display A illustrated in an upper left portion of FIG. 12 and a display B illustrated in an upper right portion are performed. The image signal Via indicating a display (full-white display) at the highest gray level that can express the whole screen is input to the display A. The image signal Via indicating a display (full-black display) at the lowest gray level that can express the whole screen is input to the display B.

In each of the display A and the display B, an oscilloscope is connected to a drive terminal of the liquid crystal panel 100 to measure a voltage value applied to the pixel electrode 120. Note that measurement of brightness (transmittance) of the pixel 102 with a photodiode or the like may substitute for measurement of a voltage applied to the pixel electrode 120 provided in the pixel 102.

Each of the display A and the display B is a uniform display across the whole screen. Therefore, these are a display in which a domain due to a difference in applied voltage between the adjacent pixel electrodes 120 does not occur, that is, a display without correction for suppressing a domain. Thus, a value of an applied voltage measured in the display A and a value of an applied voltage measured in the display B respectively indicate an applied voltage without correction corresponding to the highest gray level that can be expressed and an applied voltage without correction corresponding to the lowest gray level that can be expressed.

Next, a display C illustrated in a lower left portion of FIG. 12 and a display D illustrated in a lower right portion are performed. The image signal Via indicating a display at the highest gray level that can express one column of the pixels 102 aligned in the Y direction and at the lowest gray level that can express the rest of the pixels 102 is input to the display C. The image signal Via indicating a display at the highest gray level that can express one row of the pixels 102 aligned in the X direction and at the lowest gray level that can express the rest of the pixels 102 is input to the display D.

In each of the display C and the display D, a voltage value applied to the pixel electrode 120 or brightness (transmittance) of the pixel 102 is measured. The image signal Via input to the display C indicates a display in which the pixels 102 displayed at the lowest gray level are disposed on both sides in the X direction of the pixels 102 displayed at the highest gray level. Thus, correction for suppressing a domain is performed. In the correction, an applied voltage in the dark pixels 102 aligned on a side where a domain easily occurs in the X direction with respect to the bright pixels 102 is greater than an applied voltage in the pixels 102 aligned on the opposite side (strong correction is performed).

The image signal Via input to the display D indicates a display in which the pixels 102 displayed at the lowest gray level are disposed on both sides in the Y direction of the pixels 102 displayed at the highest gray level. Thus, correction for suppressing a domain is performed. In the correction, an applied voltage in the dark pixels 102 aligned on a side where a domain easily occurs in the Y direction with respect to the bright pixels 102 is greater than an applied voltage in the pixels 102 aligned on the opposite side (strong correction is performed).

For example, when the light-shielding film extending in the X direction has a width narrower than a width of the light-shielding film extending in the Y direction, stronger correction is performed in the Y direction. Therefore, in this case, an applied voltage to the pixel electrode 120 on a side where strong correction is performed in the X direction regarding the display C is greater than an applied voltage to the pixel electrode 120 on a side where strong correction is performed in the Y direction regarding the display D (stronger correction is performed).

In addition, for example, when the light-shielding film extending in the Y direction has a width narrower than a width of the light-shielding film extending in the X direction, stronger correction is performed in the X direction. Therefore, in this case, an applied voltage to the pixel electrode 120 on a side where strong correction is performed in the Y direction regarding the display D is greater than an applied voltage to the pixel electrode 120 on a side where strong correction is performed in the X direction regarding the display C (stronger correction is performed).

Note that when the image signal Via illustrated in the left portion of FIG. 5 (the image signal Via that displays the pixel 102 corresponding to one pixel electrode 120 at a predetermined high gray level (first gray level) and displays the pixels 102 corresponding to the other remaining pixel electrodes 120 at a lower gray level (second gray level)) or the image signal Via illustrated in the left portion of FIG. 7 (the image signal Via that displays the pixel 102 corresponding to one pixel electrode 120 at a predetermined low gray level (third gray level) and displays the pixels 102 corresponding to the other remaining pixel electrodes 120 at a higher gray level (fourth gray level)) is input, the liquid crystal display 10 operates as follows. It is assumed that a direction in which the narrow light-shielding film extends is the X direction while a direction in which the wide light-shielding film extends is the Y direction.

It is assumed that a difference in applied voltage between the pixel electrode E0 (first pixel electrode) and the pixel electrode ER1 (second pixel electrode) aligned on a side where a domain easily occurs in the X direction with respect to the pixel electrode E0 is a first applied voltage difference (for example, 3.5 V in the correction example 1 (FIG. 5), 3.5 V in the correction example 2 (FIG. 6), 3.8 V in the correction example 3 (FIG. 7), and 3.8 V in the correction example 4 (FIG. 7)).

It is assumed that a difference in applied voltage between the pixel electrode E0 and the pixel electrode EL1 (third pixel electrode) aligned on a side where a domain hardly occurs in the X direction with respect to the pixel electrode E0 is a second applied voltage difference (for example, 4.5 V in the correction example 1 (FIG. 5), 4.5 V in the correction example 2 (FIG. 6), 4.0 V in the correction example 3 (FIG. 7), and 4.0 V in the correction example 4 (FIG. 7)).

It is assumed that a difference in applied voltage between the pixel electrode E0 and the pixel electrode ED1 (fourth pixel electrode) aligned on a side where a domain easily occurs in the Y direction with respect to the pixel electrode E0 is a third applied voltage difference (for example, 3.0 V in the correction example 1 (FIG. 5), 2.8 V in the correction example 2 (FIG. 6), 3.5 V in the correction example 3 (FIG. 7), and 3.0 V in the correction example 4 (FIG. 7)).

It is assumed that a difference in applied voltage between the pixel electrode E0 and the pixel electrode EU1 (fifth pixel electrode) aligned on a side where a domain hardly occurs in the Y direction with respect to the pixel electrode E0 is a fourth applied voltage difference (for example, 4.5 V in the correction example 1 (FIG. 5), 4.5 V in the correction example 2 (FIG. 6), 4.0 V in the correction example 3 (FIG. 7), and 4.0 V in the correction example 4 (FIG. 7)).

On conditions that the first applied voltage difference is smaller than the second applied voltage difference, the third applied voltage difference is smaller than the fourth applied voltage difference, and the third applied voltage difference is smaller than the first applied voltage difference, a voltage is applied to each of the pixel electrodes 120. In other words, the signal processing unit 400 corrects the image signal Via to be input and applies a voltage to each of the pixel electrodes 120 so as to satisfy the conditions. The third applied voltage difference is made to be smaller than the first applied voltage difference, so that a tendency where a reverse tilt domain is visually identified in the Y direction more easily than in the X direction can be suppressed.

Note that when a transmittance is measured instead of an applied voltage, the following conditions are satisfied. It is assumed that a difference in transmittance between the pixel P0 corresponding to the pixel electrode E0 and each of the pixels PR1, PL1, PD1, and PU1 corresponding to the pixel electrodes ER1, EL1, ED1, and EU1, respectively, are first to fourth transmittance differences. On conditions that the first transmittance difference is smaller than the second transmittance difference, the third transmittance difference is smaller than the fourth transmittance difference, and the third transmittance difference is smaller than the first transmittance difference, a voltage is applied to each of the pixel electrodes 120. In other words, the signal processing unit 400 corrects the image signal Via to be input and applies a voltage to each of the pixel electrodes 120 so as to satisfy the conditions. The third transmittance difference is made to be smaller than the first transmittance difference, so that a tendency where a reverse tilt domain is visually identified in the Y direction more easily than in the X direction can be suppressed.

Application Example

Figure 13:
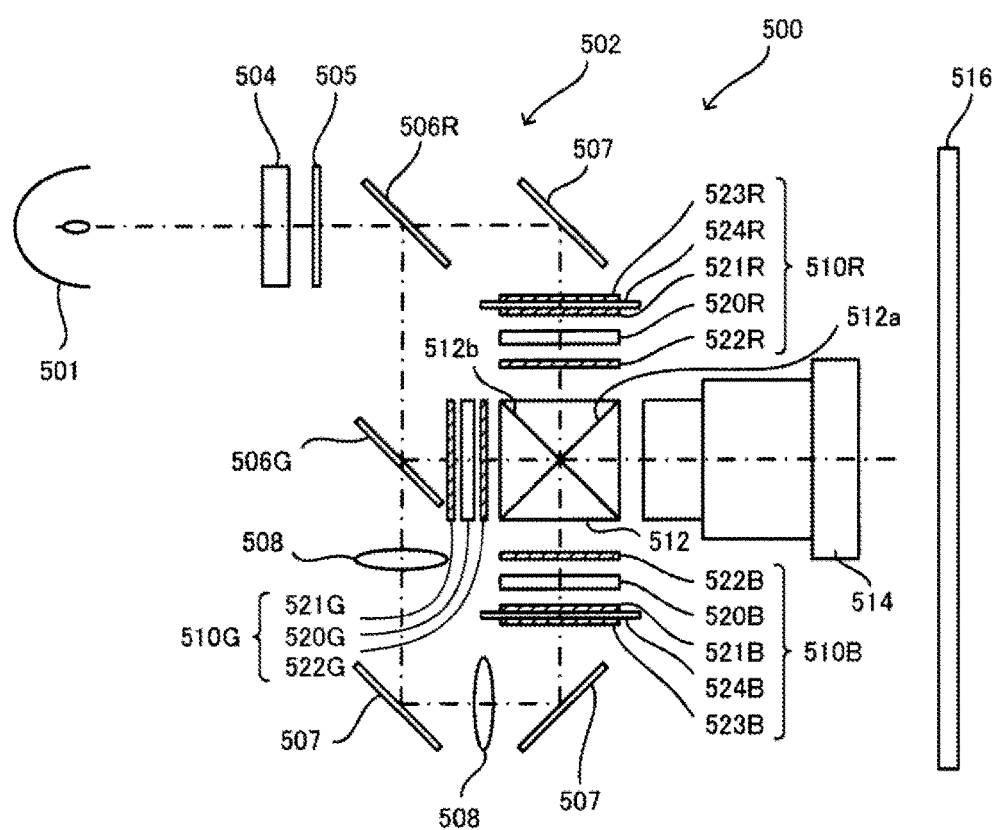
FIG. 13 is a schematic diagram illustrating an optical system of a projector by an application example.

Next, a projection display device (projector) will be described as the liquid crystal display 10 in some exemplary embodiments mentioned above. FIG. 13 is a schematic diagram exemplifying an optical system of a projector 500 by an application example. The projector 500 includes a light source device 501, an integrator 504, a polarization converting element 505, a color separation light-guiding optical system 502, a liquid crystal light modulating device 510R, a liquid crystal light modulating device 510G, and a liquid crystal light modulating device 510B as light modulating devices, a cross dichroic prism 512, and a projection optical system 514. As mentioned below, the liquid crystal light modulating devices 510R, 510G, and 510B respectively include liquid crystal displays 520R, 520G, and 520B. The above-mentioned liquid crystal display 10, for example, can be used as these liquid crystal displays 520R, 520G, and 520B.

The light source device 501 is configured to supply light including red light (hereinafter referred to as "R light") being first color light, green light (hereinafter referred to as "G light") being second color light, and blue light (hereinafter referred to as "B light") being third color light. An ultra-high pressure mercury lamp, for example, can be used as the light source device 501.

The integrator 504 is configured to equalize illumination distribution of light emitted from the light source device 501. The light having the equalized illumination distribution is converted into a polarized light having a specific vibration direction in the polarization converting element 505, for example, an s-polarized light that is s-polarized with respect to a reflection surface of the color separation light-guiding optical system 502. The light converted into the s-polarized light is incident on an R-light transmitting dichroic mirror 506R constituting the color separation light-guiding optical system 502.

The color separation light-guiding optical system 502 includes the R-light transmitting dichroic mirror 506R, a B-light transmitting dichroic mirror 506G, three reflecting mirrors 507, and two relay lenses 508.

The R-light transmitting dichroic mirror 506R is configured to allow transmission of the R light and reflects the G light and B light. The R light transmitted through the R-light transmitting dichroic mirror 506R is incident on the reflecting mirror 507.

The reflecting mirror 507 is configured to bend an optical path of the R light by 90 degrees. The R light having the optical path bent is incident on the R-light liquid crystal light modulating device 510R. The R-light liquid crystal light modulating device 510R includes a transmission liquid crystal device that modulates the R light in response to an image signal.

The R-light liquid crystal light modulating device 510R includes a λ/2 phase difference plate 523R, a glass plate 524R, a first polarizing plate 521R, the liquid crystal display 520R, and a second polarizing plate 522R. The λ/2 phase difference plate 523R and the first polarizing plate 521R are disposed in contact with the light transmissive glass plate 524R that does not convert a polarization direction. Note that in FIG. 13, the second polarizing plate 522R is independently provided, but may be disposed in contact with an emitting surface of the liquid crystal display 520R or an incident surface of the cross dichroic prism 512.

Optical paths of the G light and the B light reflected by the R-light transmitting dichroic mirror 506R are bent by 90 degrees. The G light and the B light having the optical paths bent are incident on the B-light transmitting dichroic mirror 506G. The B-light transmitting dichroic mirror 506G reflects the G light and allows transmission of the B light. The G light reflected by the B-light transmitting dichroic mirror 506G is incident on the G-light liquid crystal light modulating device 510G. The G-light liquid crystal light modulating device 510G includes a transmission liquid crystal device that modulates the G light in response to an image signal. The G-light liquid crystal light modulating device 510G includes the liquid crystal display 520G, a first polarizing plate 521G, and a second polarizing plate 522G.

The G light incident on the G-light liquid crystal light modulating device 510G is converted into an s-polarized light. The s-polarized light incident on the G-light liquid crystal light modulating device 510G is transmitted as it is through the first polarizing plate 521G and is incident on the liquid crystal display 520G. The s-polarized light of the G light incident on the liquid crystal display 520G is converted into a p-polarized light by modulation in response to an image signal. The G light converted into the p-polarized light by the modulation of the liquid crystal display 520G is emitted from the second polarizing plate 522G. In this way, the G light modulated by the G-light liquid crystal light modulating device 510G is incident on the cross dichroic prism 512.

The B light transmitted through the B-light transmitting dichroic mirror 506G is incident on the B-light liquid crystal light modulating device 510B via the two relay lenses 508 and the two reflecting mirrors 507.

The B-light liquid crystal light modulating device 510B includes a transmission liquid crystal device that modulates the B light in response to an image signal. The B-light liquid crystal light modulating device 510B includes a λ/2 phase difference plate 523B, a glass plate 524B, a first polarizing plate 521B, the liquid crystal display 520B, and a second polarizing plate 522B.

The B light incident on the B-light liquid crystal light modulating device 510B is converted into an s-polarized light. The s-polarized light incident on the B-light liquid crystal light modulating device 510B is converted into a p-polarized light by the λ/2 phase difference plate 523B. The B light converted into the p-polarized light is transmitted as it is through the glass plate 524B and the first polarizing plate 521B and is incident on the liquid crystal display 520B. The p-polarized light of the B light incident on the liquid crystal display 520B is converted into an s-polarized light by modulation in response to an image signal. The B light converted into the s-polarized light by the modulation of the liquid crystal display 520B is emitted from the second polarizing plate 522B. The B light modulated by the B-light liquid crystal light modulating device 510B is incident on the cross dichroic prism 512.

In this way, the R-light transmitting dichroic mirror 506R and the B-light transmitting dichroic mirror 506G that constitute the color separation light-guiding optical system 502 are configured to separate the light supplied from the light source device 501 into the R light being the first color light, the G light being the second color light, and the B light being the third color light.

The cross dichroic prism 512 as a color synthesis optical system includes two dichroic films 512a and 512b disposed orthogonally in an X shape. The dichroic film 512a reflects the B light and allows transmission of the G light. The dichroic film 512b reflects the R light and allows transmission of the G light. In this way, the cross dichroic prism 512 is configured to combine the R light, the G light, and the B light modulated by the R-light liquid crystal light modulating device 510R, the G-light liquid crystal light modulating device 510G, and the B-light liquid crystal light modulating device 510B, respectively.

The projection optical system 514 is configured to project the light combined by the cross dichroic prism 512 onto a screen 516. Thus, a full-color image can be obtained on the screen 516. In this way, the above-mentioned liquid crystal display 10 can be used in the projector 500 as one example.

Note that the above-mentioned liquid crystal display 10 can be used in a front projection projector that projects a projection image from an observation side or can be used in a rear projection projector that projects a projection image from a side opposite to an observation side.

Note that an electronic device to which the liquid crystal display 10 can be applied is not limited to the projector 500. The liquid crystal display 10 may be used as, for example, a projection head up display (HUD), a direct-view head-mounted display (HMD), or a display unit of a information terminal device such as an electronic book, a personal computer, a digital still camera, a liquid crystal television, a viewfinder video recorder, a monitor direct-view video recorder, a car navigation system, an electronic organizer, and a POS.

This application claims priority to Japan Patent Application No. 2017-147394 filed Jul. 31, 2017, the entire disclosures of which are hereby incorporated by reference in their entireties.

What is claimed is:

1. A liquid crystal display comprising:
a plurality of pixel electrodes arranged in a first direction and a second direction intersecting the first direction;
an element substrate including the plurality of pixel electrodes;
a counter substrate including a common electrode;
a liquid crystal layer sandwiched between the element substrate and the counter substrate;
a first light-shielding film extending in the first direction along a first side of the plurality of pixel electrodes;
a second light-shielding film extending in the second direction along a second side of the plurality of pixel electrodes;
a liquid crystal panel in which a width of the first light-shielding film is narrower than a width of the second light-shielding film;
a correction unit configured to specify, based on an input image signal, a set of pixel electrodes of the plurality of pixel electrodes to be determined such that a difference in voltage to be applied to each of two pixel electrodes in alignment is greater than or equal to a predetermined value and that a reverse tilt domain occurs, and to correct the input image signal to reduce a difference in the voltage to be applied in a specified set of pixel electrodes; and
a driving unit configured to apply a voltage to the plurality of pixel electrodes based on the input image signal corrected by the correction unit, wherein
the correction unit is configured to:
correct, in a case where two pixel electrodes included in the specified set of pixel electrodes are aligned in the second direction, the input image signal to increase a decreased amount of a difference in the applied voltage in comparison with correction performed in a case where the two pixel electrodes are aligned in the first direction.

2. A liquid crystal display according to claim 1, wherein the correction unit is configured to:
correct, in a case where two pixel electrodes included in the specified set of pixel electrodes are aligned in the first direction, the input image signal to reduce a decreased amount of the difference in the applied voltage in comparison with correction performed in a case where the two pixel electrodes are aligned in the second direction.

3. An electronic device comprising the liquid crystal display according to claim 1.

4. A liquid crystal display comprising:
a plurality of pixel electrodes arranged in a first direction and a second direction intersecting the first direction;
an element substrate including the plurality of pixel electrodes;
a counter substrate including a common electrode;
a liquid crystal layer sandwiched between the element substrate and the counter substrate;
a first light-shielding film extending in the first direction along a first side of the plurality of pixel electrodes;
a second light-shielding film extending in the second direction along a second side of the plurality of pixel electrodes;
a liquid crystal panel in which a width of the first light-shielding film is narrower than a width of the second light-shielding film; and
a signal processing unit configured to apply a voltage to the plurality of pixel electrodes based on an input image signal, wherein
in a case where an image signal for displaying a pixel corresponding to a first pixel electrode of the plurality of pixel electrodes at a first gray level and for displaying a pixel corresponding to another remaining pixel electrode at a second gray level lower than the first gray level is input as the input image signal, or in a case where an image signal for displaying a pixel corresponding to a first pixel electrode of the plurality of pixel electrodes at a third gray level and displays a pixel corresponding to another remaining pixel electrode at a fourth gray level higher than the third gray level is input as the input image signal, and
the signal processing unit is configured to correct the input image signal, and to apply the voltage to the plurality of pixel electrodes in such a way that a first applied voltage difference is smaller than a second applied voltage difference, a third applied voltage difference is smaller than a fourth applied voltage difference, and the third applied voltage difference is smaller than the first applied voltage difference,
the first applied voltage difference being a difference in applied voltage between the first pixel electrode and a second pixel electrode aligned on a side where a reverse tilt domain easily occurs in the first direction with respect to the first pixel electrode,
the second applied voltage difference being a difference in applied voltage between the first pixel electrode and a third pixel electrode aligned on a side where a reverse tilt domain hardly occurs in the first direction with respect to the first pixel electrode,
the third applied voltage difference being a difference in applied voltage between the first pixel electrode and a fourth pixel electrode aligned on the side where the reverse tilt domain easily occurs in the second direction with respect to the first pixel electrode,
the fourth applied voltage difference being a difference in applied voltage between the first pixel electrode and a fifth pixel electrode aligned on the side where the reverse tilt domain hardly occurs in the second direction with respect to the first pixel electrode.

5. An electronic device comprising the liquid crystal display according to claim 4.

6. A liquid crystal display comprising:
a plurality of pixel electrodes arranged in a first direction and a second direction intersecting the first direction;
an element substrate including the plurality of pixel electrodes;
a counter substrate including a common electrode;
a liquid crystal layer sandwiched between the element substrate and the counter substrate;
a first light-shielding film extending in the first direction along a first side of the plurality of pixel electrodes;
a second light-shielding film extending in the second direction along a second side of the plurality of pixel electrodes;
a liquid crystal panel in which a width of the first light-shielding film is narrower than a width of the second light-shielding film; and a signal processing unit configured to apply a voltage to the plurality of pixel electrodes based on an input image signal, wherein in a case where an image signal for displaying a pixel corresponding to a first pixel electrode of the plurality of pixel electrodes at a first gray level and for displaying a pixel corresponding to another remaining pixel electrode at a second gray level lower than the first gray level is input as the input image signal, or in a case where an image signal for displaying a pixel corresponding to a first pixel electrode of the plurality of pixel electrodes at a third gray level and for displaying a pixel corresponding to another remaining pixel electrode at a fourth gray level higher than the third gray level is input as the input image signal, and the signal processing unit is configured to correct the input image signal, and to apply the voltage to the plurality of pixel electrodes in such a way that a first transmittance difference is smaller than a second transmittance difference, a third transmittance difference is smaller than a fourth transmittance difference, and the third transmittance difference is smaller than the first transmittance difference, the first transmittance difference being a difference in transmittance between a pixel corresponding to the first pixel electrode and a pixel corresponding to a second pixel electrode aligned with the first pixel electrode on a side where a reverse tilt domain easily occurs in the first direction, the second transmittance difference being a difference in transmittance between the pixel corresponding to the first pixel electrode and a pixel corresponding to a third pixel electrode aligned with the first pixel electrode on a side where a reverse tilt domain hardly occurs in the first direction, the third transmittance difference being a difference in transmittance between the pixel corresponding to the first pixel electrode and a pixel corresponding to a fourth pixel electrode aligned with the first pixel electrode on the side where a reverse tilt domain easily occurs in the second direction, the fourth transmittance difference being a difference in transmittance between the pixel corresponding to the first pixel electrode and a pixel corresponding to a fifth pixel electrode aligned with the first pixel electrode on the side where a reverse tilt domain hardly occurs in the second direction.

7. An electronic device comprising the liquid crystal display according to claim 6.

8. A liquid crystal display comprising:

a first pixel electrode;

a second pixel electrode adjacent to the first pixel electrode in a first direction;

a third pixel electrode adjacent to the first pixel electrode in the second direction intersecting the first direction;

a first light-shielding film arranged in the first direction along a first side of the first pixel electrode and the second pixel electrode;

a second light-shielding film arranged in the second direction along a second side of the first pixel electrode and the third pixel electrode; and a correction unit configured to correct at least one of a first input image signal corresponding to the first pixel electrode and a second input image signal corresponding to the second pixel electrode so that a first voltage difference between a first voltage to be applied to the first pixel electrode based on the first input image signal and a second voltage to be applied to the second pixel electrode based on the second input signal is reduced, and to correct at least one of the first input image signal and a third input image signal corresponding to the third pixel electrode so that a second voltage difference between the first voltage and a third voltage to be applied to the third pixel electrode based on the third input signal is reduced, wherein a width of the first light-shielding film is narrower than a width of the second light-shielding film, and the correction unit corrects at least one of the first input image signal, the second input image signal and the third input image signal so that a decreased amount of the second voltage difference is smaller than a decreased amount of the first voltage difference.

9. An electronic device comprising the liquid crystal display according to claim 8.

* * * * *